Patented Aug. 2, 1927.                                         1,637,612

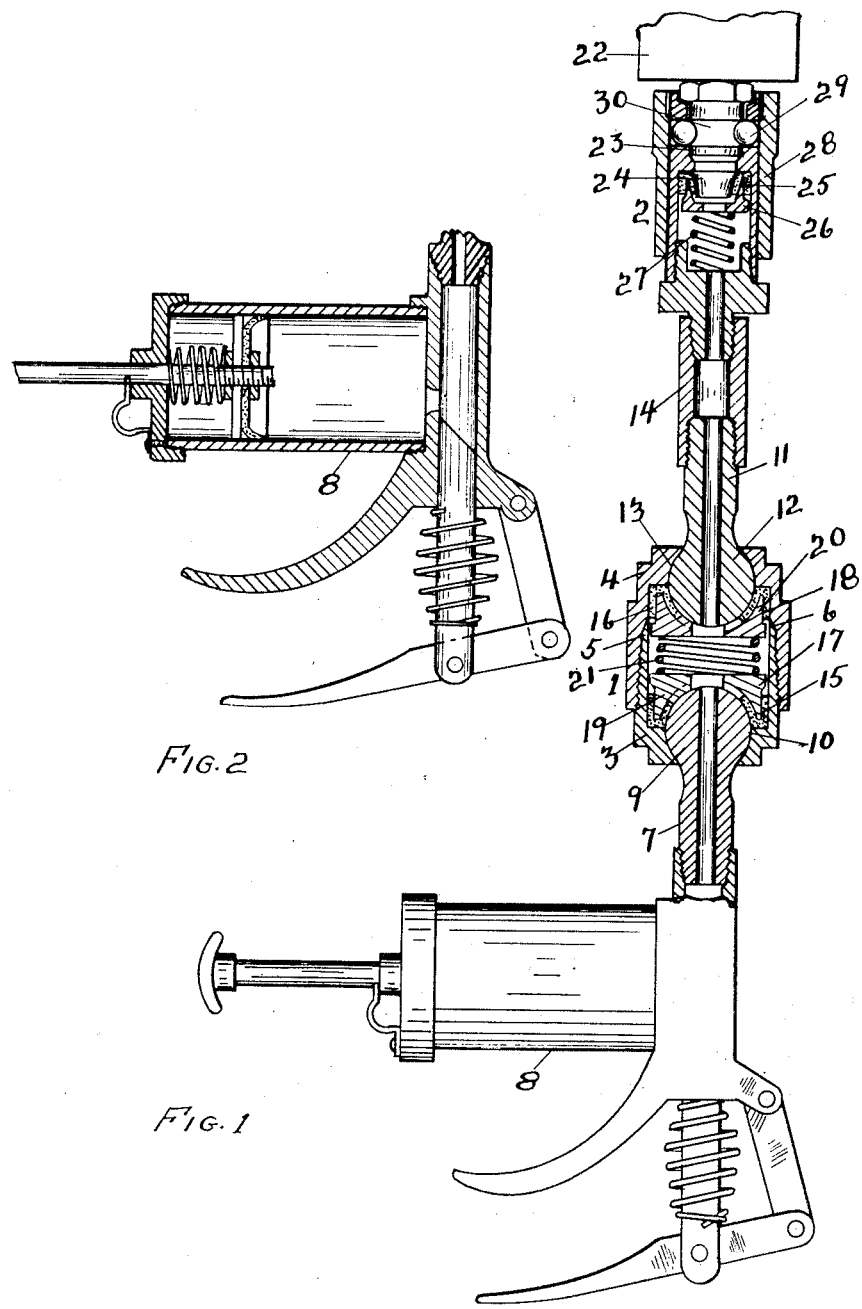

UNITED STATES PATENT OFFICE.

WALTER F. HUNDEMER, OF ALAMEDA, CALIFORNIA, ASSIGNOR, BY MESNE ASSIGNMENTS, TO GAT GUN LUBRICATING CORPORATION, OF OAKLAND, CALIFORNIA, A CORPORATION OF CALIFORNIA.

HIGH-PRESSURE GREASE COUPLING.

Original application filed July 21, 1924, Serial No. 727,342. Divided and this application filed June 1, 1925. Serial No. 33,997.

My invention is an improved high pressure grease conduit and coupling applicable for the lubrication of machine bearings, and the invention as disclosed herein is for the particular combination of the grease gun, the conduit, and the coupling.

This is a division of my application No. 727,342 filed July 21, 1924, for high pressure grease conduit.

An object of my invention is to make a flexible joint or coupling using a cupped flexible washer with a forming member adapted to force the washer into shape independent of its shaping under the pressure due to the oil being conveyed through the joint or coupling. I have a ball joint with cups forming bearings for the balls, ducts passing through the joint, and the flexible cupped washers bearing on the inner periphery of the ball joints. They are held in place by forming washers having ring extensions to positively shape the washers. A coupling having a tapered fitting may also be used with the cupped washers and the forming washers fitting therein. It is desirable to have some means for positively pressing the forming washers into the cupped part of the flexible washer and this may be done by a spring. However, in a ball joint I limit the movement of the forming washers by having them bear on the surface of the spherical ball.

In high pressure flexible joints it is very difficult to prevent the leakage of oil through the screw threads. I, therefore, provide a form of contacting parts on the screw threaded members, whereby the inner member, preferably of a cup, is pressed inwardly against the other forming an oil tight joint independent of the threads. The joint shown herein is to a certain extent an improvement over my application, Serial No. 682,933, for flexible joint, filed December 27, 1923, and is designed particularly to utilize the U shaped washers shown in application of Claude E. White, Serial No. 724,299, filed July 5, 1924.

Figure 1 is a section of my conduit with an attached grease gun and booster gun.

Figure 2 is a cross-section of the booster gun.

Referring more particularly to the drawing, my conduit consists of a flexible joint 1 and a coupling 2 on the end thereof. The joint 1 is formed of two cups 3 and 4, the cup 3 threading into the cup 4. The cup 3 has an extension 5 beyond the threads thereon which tapers to a thin edge, and is adapted to seat against a taper seat 6 in the cup 4. Thus when the two cups are secured together the extension 5 will conform to the seat 6 and press tightly thereon, and thus seal the joint against leakage without relying on the threads.

A conduit 7 is threaded at one end into the pressure gun 8, which is of any desired high pressure type. The particular gun shown is that disclosed in Patent 1,337,023 dated May 3, 1921 to B. S. Nelson for a lubricating device. The other end of the conduit 7 is formed with a ball 9, which is adapted to rest in a seat 10 in the end of the cup 3. A conduit 11 is formed with a ball end 12 which rests in a seat 13 in the cup 4. This conduit also threads into one end of a pipe extension 14, and if desired the coupling 2 is threaded into the other end thereof. The metallic seats 10 and 13 are not sufficient to seal the joint 1 against leakage under high pressures, therefore, cup or U washers 15 and 16 are provided which surround the balls 9 and 12 respectively. These washers must be spread apart so that they will at all times bear against the balls and the sides of the joint, or the grease would creep back of them and thus obviate their usefulness.

To accomplish this purpose, I provide forming washers 17 and 18 which are provided with ring extensions 19 and 20 adapted to extend into the U washers 15 and 16 respectively. A spring 21 bears against the forming washers 17 and 18 to urge them against the U washers 15 and 16 respectively, thus insuring a bearing against the balls 9 and 12 and against the inner wall of the joint 1.

The bearing 22 has a fitting 23 extending therein, the end of which is tapered as at 24 to receive the cup or U washer 25 positioned within the coupling 2. A spreader, or forming washer 26 similar to the washers 17 and 18 enters the cup washer 25 and is held in position by a spring 27.

The coupling 2 is secured to the fitting 23 in any suitable manner, such as by a sleeve 28 forcing the balls 29 into an annular groove 30 in the fitting.

The forming washers 17 and 18 do not press tightly against the U washers 15 and 16, but bear against the balls 9 and 12. Thus, the U washers float between the forming washers and the housing, except when under pressure, at which time they press tightly against the balls and the housing. Thus there is very little wear upon the U washers which materially increases their life.

It will be noted that the balls 9 and 12 in so far as their action with the cupped washers 15 and 16 is concerned, function substantially the same as the tapered fitting 23 in the coupling. This latter has a conical taper, whereas the ball joints have a spherical taper. Both utilize the forming washers 17, 18 and 26 in the coupling member. The forming washers 26 may be pressed tightly into the cupped washers 25 by the spring 27, but in the ball joint it is desired to limit the pressing action of the forming washers 17 and 18 by merely having the ring extensions 19 and 20 extend into the cupped washers but not force it against the cups 3 and 4. To effect this, forming washers 17 and 18 bear upon the inner spherical surface of the balls 9 and 12.

It will be noted that the extension 5 of the cup 3 is brought to a thin edge and presses against the seat 6, which is curved, of the cup 4. When two cups are taken together by a screw threaded connection the extension 5 is forced inwardly and makes an oil tight circular joint at either point of contact, so that the screw threads are relied upon to form an oil tight connection between the cups.

It will be noted that the cupped washers are annular and have lips of considerable extent so that as the cupped washer is made of flexible material these lips will conform to the shape of the tapered fitting and the outside walls and when used in the ball joint conform to the shape of the ball and also bear tightly against the outside walls.

It is also to be noted that the forming washers are of a floating type and extend inwardly between the lips of the cupped washer holding these in their required shape, both before they are subjected to the pressure of the grease being transmitted and after such pressure is removed. These cupped washers and their co-operating forming washers are to be distinguished from packing rings which are held in position by an annular ring pressing there against which latter structures do not preform a cupped washer and do not preform any function due to the pressure of the grease or fluid being transmitted.

Having described my invention, what I claim is:—

1. A fitting, formed with a tapered mouth and an enlarged base portion, a coupling comprising a cup formed with a perforation in the bottom thereof allowing the latter to slide over the tapered mouth and against the enlarged base so as to form a groove defined by the bottom and the side wall of the cup and the tapered mouth of the fitting, and in which the bottom of the groove joins the tapered mouth at the bottom end of the taper, an annular U shaped washer in said groove having an outer flange lying against the wall of the cup and an inner flange tapered to fit on the tapered mouth of the fitting and a spreader having an annular tongue extending into the space between the flanges for positioning the washer when applying the coupling, with yielding means urging the spreader into the washer.

2. A combination as defined in claim 1 in which the base portion of the fitting is formed with an annular groove and in which the cup has an extension beyond the bottom adapted to telescope on the base of the fitting while a sleeve slidable on the cup is adapted to drive balls movable in the extension into the groove for interlocking the coupling with the fitting without requiring a turning movement of the coupling.

In testimony whereof I affix my signature.

WALTER F. HUNDEMER.